May 23, 1950 J. E. HODER 2,509,060
COLLAPSIBLE AUTOMOBILE TRAY
Filed Nov. 27, 1948
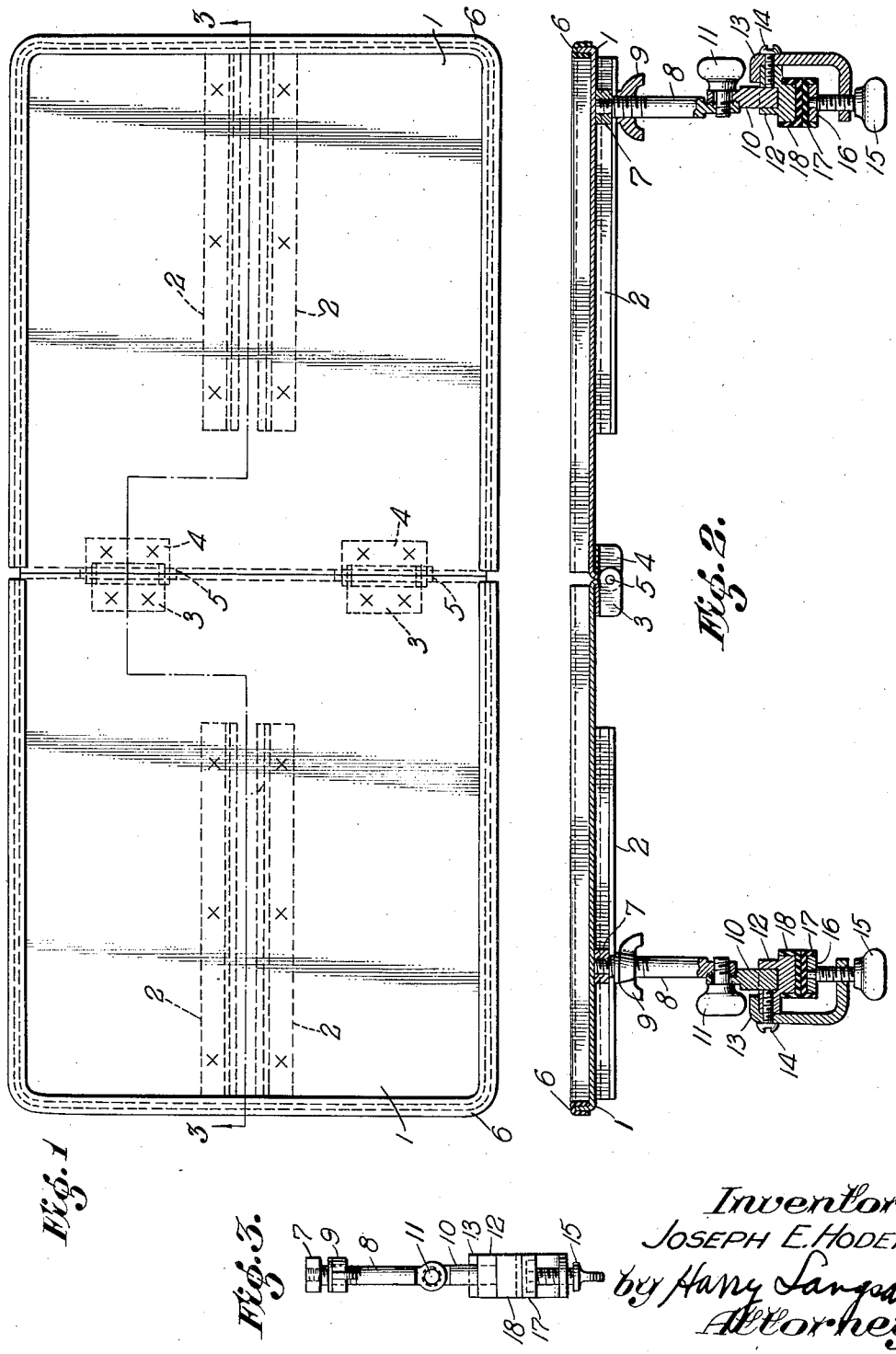
Inventor:
JOSEPH E. HODER,
by Harry Sangean
Attorney Patented May 23, 1950

2,509,060

UNITED STATES PATENT OFFICE 2,509,060

COLLAPSIBLE AUTOMOBILE TRAY

Joseph E. Hoder, Philadelphia, Pa.

Application November 27, 1948, Serial No. 62,397

1 Claim. (Class 311—21)

My invention relates to an automobile tray and particularly relates to a tray adapted to be clamped to the glove compartment door of an automobile.

To my knowledge a tray adapted to be attached to an automobile glove compartment door has never been made. Such a tray which may be quick mounting and demountable can readily serve as a food tray for roadside stands and theatres or movies, as desk space for writing and map reading, and handy as a women's cosmetic kit.

It, therefore, is an object of my invention to provide a collapsible tray which is adapted to clamp upon the glove compartment door of an automobile.

Another object of my invention is to provide a tray which may be rapidly attached or detached from the glove compartment door of an automobile.

Another object of my invention is to provide a collapsible tray which is adapted to be attached to and detached from the glove compartment door of an automobile and which is complete of itself.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawing in which:

Fig. 1 is a plan view of the tray embodying my invention.

Fig. 2 is a vertical sectional view taken along the line 3—3 of Fig. 1.

Fig. 3 is a vertical side view of the clamping leg.

Referring now in greater detail to the drawing in which similar reference characters refer to similar parts, I show a top tray 1 which has parallel V-shaped guides 2, 2 spot welded to the underneath surface for the purpose of serving as a guide for a slide 7, which will hereinafter be further described. The top tray is made of two parts hinged together by a pair of hinges A, A. Each hinge A comprises two hinge parts 3, 4, pivotally joined together by a rod 5. The hinge parts 3 and 4 are spot welded to the lower surface of the top tray sections 1, 1 and they are flanged downwardly to add strength to the hinge in order to prevent the tray top from collapsing when in open horizontal position.

The uppermost flanged edge 1 of the top of the tray has a rubber protective edging 6 covering the flange.

Each clamping leg B includes a slide 7 which interfits with one pair of the underside guides 2, 2 whereby the leg may be moved lengthwise of the tray. The slide 7 is tapped to receive a vertically extending pin 8, and the pin has a wing-nut 9 threadedly engaged thereto. The wing-nut 9 is adapted to lock against the underside surface of the guide 2 so that the leg B cannot move.

The lower end of the upper vertical pin 8 has a threaded opening therein and is serrated at one side of the threaded opening. A lower vertical pin 10 has an unthreaded opening therein which is adapted to be aligned with the threaded opening in the upper vertical pin 8, and the lower pin 10 has a serrated side adjacent its unthreaded opening so that the serrated surfaces of both the upper and lower pins 8, 10, respectively, may abut one another. A thumb screw 11 is screwed into the threaded opening in the vertical pin 8 and it locks the lower pin 10 to the upper pin 8.

A block or jaw 12, firmly attached to the lower pin 10, has a vertical stand 13 fastened thereto by a holding screw 14. The screw 14 passes through the stand 13 and bites into the lower pin 10. A thumb screw 15 vertically extending through the lower end of the stand 13 has a clamping swivel or jaw 16 at its uppermost end and the swivel 16 is adapted to abut against the glove compartment door in order to press against the other jaw 12. A rubber cover 17 is cemented to the clamping swivel or jaw 16 and a rubber cover 18 is cemented securely to the other block or jaw 12 so that the opposite sides of the glove compartment may be gripped.

When the tray is to be dismounted the clamping legs 15 are opened and the tray is removed easily, and it is easily closed; and since it is compact the tray easily folds within the glove compartment of the automobile.

In use, my invention may be adjusted so that the legs B, B fit upon different width glove compartment doors. The tray may be tilted or leveled by virtue of the relative adjustment of the two pins 8 and 10. The clamping jaws 12 and 16 and the thumb screw 15 enables the tray to be quickly attached to or detached from a glove compartment door.

Although my invention has been described in considerable detail, the invention may be variously embodied and is to be limited only by the scope of the appended claim.

I claim:

A tray attached to an automobile glove compartment door comprising two parts pivoted together, each part of said tray having a guide rigidly mounted thereon, a slide interfitting with said guide and sliding along said guide, a vertically located upper pin threadedly attached to said slide and having a serrated portion at its lower end, a wing nut locking said slide to said guide, a lower pin having a serrated portion adapted to complement and to engage the serrated portion on the upper pin, and a removable clamp on said lower pin portion engaging a portion of the automobile glove compartment door.

JOSEPH E. HODER.

REFERENCES CITED

The following references are of record in the file of this patent:

UNITED STATES PATENTS

| Number | Name | Date |
|---|---|---|
| 706,869 | Alstyne | Aug. 12, 1902 |
| 1,024,804 | Mergner | Apr. 30, 1912 |
| 1,108,692 | Burd | Aug. 25, 1914 |
| 1,247,112 | Holmberg et al. | Nov. 20, 1917 |
| 1,597,081 | Lyon | Aug. 24, 1926 |
| 1,770,955 | Storm | July 22, 1930 |
| 1,891,834 | Pendleton | Dec. 20, 1932 |
| 1,900,325 | Bayman | Mar. 7, 1933 |
| 2,067,661 | Ferrelle | Jan. 12, 1937 |